United States Patent
Kreitzer et al.

(10) Patent No.: US 10,497,078 B2
(45) Date of Patent: Dec. 3, 2019

(54) METHOD AND APPARATUS FOR RESOURCE PAIRING

(71) Applicant: MOTOROLA SOLUTIONS, INC, Schaumburg, IL (US)

(72) Inventors: Stuart S. Kreitzer, Coral Springs, FL (US); Jesus F. Corretjer, Weston, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 623 days.

(21) Appl. No.: 14/931,881

(22) Filed: Nov. 4, 2015

(65) Prior Publication Data
US 2017/0124676 A1    May 4, 2017

(51) Int. Cl.
| | |
|---|---|
| *G06Q 50/26* | (2012.01) |
| *G06F 16/22* | (2019.01) |
| *G06F 16/9535* | (2019.01) |
| *H04W 4/029* | (2018.01) |
| *G06Q 10/06* | (2012.01) |
| *H04L 29/08* | (2006.01) |
| *H04W 4/80* | (2018.01) |

(52) U.S. Cl.
CPC .......... *G06Q 50/265* (2013.01); *G06F 16/22* (2019.01); *G06F 16/9535* (2019.01); *G06Q 10/06313* (2013.01); *G06Q 10/063112* (2013.01); *H04L 67/34* (2013.01); *H04W 4/029* (2018.02); *H04W 4/80* (2018.02)

(58) Field of Classification Search
None
See application file for complete search history.

(56) References Cited

U.S. PATENT DOCUMENTS

| | | |
|---|---|---|
| 5,745,126 A | 4/1998 | Jain et al. |
| 6,598,046 B1 | 7/2003 | Goldberg et al. |
| 7,711,838 B1 | 5/2010 | Boulter et al. |
| 7,865,394 B1 | 1/2011 | Calloway et al. |
| 8,196,032 B2 | 6/2012 | Hua et al. |
| 8,204,473 B2 | 6/2012 | Mathis et al. |
| 8,379,551 B2 | 2/2013 | Wietfeldt et al. |

(Continued)

FOREIGN PATENT DOCUMENTS

| | | |
|---|---|---|
| CA | 2756191 | 9/2005 |
| EP | 2150057 | 2/2010 |
| WO | 2013122809 A1 | 8/2013 |

OTHER PUBLICATIONS

The International Search and the Written Opinion, corresponding application no. PCT/US2016/059333, filed: Oct. 28, 2016, all pages.

*Primary Examiner* — Kurtis Gills
*Assistant Examiner* — Akosua Kyereme-Tuah (57) ABSTRACT

A method and apparatus for pairing resources to equipment is provided herein. During operation a resource pairing engine (RPE) determines public-safety officers at the incident scene, determines equipment associated with the public-safety officers at the incident scene, determines capabilities of the public-safety officers at the incident scene, determines the capabilities of the equipment associated with the public-safety officers at the incident scene, determines the resources at the incident scene, and transmits instructions to pair resources at the incident scene to public-safety officers equipment for monitoring and controlling the equipment.

8 Claims, 4 Drawing Sheets

(56) References Cited

U.S. PATENT DOCUMENTS

| | | | |
|---|---|---|---|
| 2005/0001720 A1 | 1/2005 | Mason et al. | |
| 2007/0067767 A1* | 3/2007 | Da Silva Neto | G05B 19/0423 717/174 |
| 2009/0174547 A1* | 7/2009 | Greene | A62B 99/00 340/539.13 |
| 2010/2005166 | 8/2010 | Boulter et al. | |
| 2011/0071880 A1 | 3/2011 | Spector | |
| 2011/0078323 A1 | 3/2011 | Wooden | |
| 2012/0282879 A1* | 11/2012 | Smith | H04W 72/10 455/404.1 |
| 2014/0134971 A1* | 5/2014 | Monks | G01S 5/02 455/404.2 |
| 2015/0206419 A1* | 7/2015 | Johnson | G08B 25/009 340/936 |
| 2016/0288905 A1* | 10/2016 | Gong | G06F 16/29 |

\* cited by examiner

METHOD AND APPARATUS FOR RESOURCE PAIRING

FIELD OF THE INVENTION

The present invention generally relates pairing resources, and more particularly to a method and apparatus for pairing resources.

BACKGROUND OF THE INVENTION

New information gathering technologies and incident-wide networking challenge first responders to effectively utilize the increasing volume of time-critical information created during an incident. This motivates the development of automated systems to sort and route information to officers trained to monitor, analyze, control, and act upon specific information domains such as video, tactical, voice communications, health, environment, etc. For example, multiple public-safety officers may arrive at an incident scene. The incident scene may have a stationary camera along with a drone that provides video to various officers. It would be beneficial to quickly pair (route) the video feeds to the public-safety officers that can best analyze the data and control the resources. Therefore, a need exists for a method and apparatus for resource pairing that quickly pairs the appropriate resources with the appropriate public-safety officers on scene.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for pairing resources to equipment is provided herein. During operation a resource pairing engine (RPE) determines public-safety officers at the incident scene, determines equipment associated with the public-safety officers at the incident scene, determines capabilities of the public-safety officers at the incident scene, determines the capabilities of the equipment associated with the public-safety officers at the incident scene, determines the resources at the incident scene, and transmits instructions to pair resources at the incident scene to public-safety officers equipment.

The step of pairing resources comprises the step of pairing a particular resource with a particular officer that is best capable of operating the particular resource as indicated by the database. Software for operating the particular resource may be pushed to equipment operated by the particular officer, wherein the software aides the particular officer in operating the particular resource.

The RPE is capable of:
  detecting and selecting pre-existing or native resources (e.g. PTZ (Pan, Tilt, Zoom) surveillance cameras, sensors, drones, etc.) already present at the incident site that have relevant information for the incident;
  detecting and selecting ad-hoc resources (e.g. drones, sensor information feeds, robots, etc) dynamically activated at the incident;
  detecting and removing duplication of information feeds from native and ad-hoc resources;
  constructing rules for intelligently pairing resources to each human resource (expert) involved in the incident—either physically present at the incident or in a remote location;
  connecting resources to experts involved in the incident, according to the above constructed rules;
  storing officer profiles for use in the construction of the pairing rules;
  dynamically maintaining a officer profile data, based on officer presence/assignment at the incident and configuration information of the officer's equipment; and
  pushing and/or activating the necessary software to equipment on scene to aide in controlling and/or monitoring the resource.

The RPE examines properties of both resources supporting incident operations and profiles for trained/expert analysts in order to match resources to the most relevant trained/expert analyst involved in the incident. Resource properties can include (but are not limited to):
  type of resource (e.g. audio such as a gunshot detector or a long-range microphone), surveillance cameras, robots, drones, toxic gas sensors, wind direction detectors, officer locating and tracking equipment at an incident, etc.);
  resource model;
  location, accuracy, reliability, etc.;
  security level/requirements; and
  monitor only, control only, and monitor/control type of resource.

Officer capabilities can include (but are not limited to):
  training or areas of expertise;
  trained or certified to monitor, analyze, interpret, and/or act on information from specific data monitoring devices (audio, video, sensors, etc.);
  trained to handle specific information domains, like PTZ camera, monitor/control drones, robotic resource, specific resource types/models, etc.;
  trained for data monitoring only or data monitoring and control;
  security levels and clearance requirements;
  role played in the incident (e.g. Incident Commander, first responder, firefighter, police officer, etc.); and
  officer rank.

In order to eliminate confusion, the following text refers to the terms "resources" and "equipment". The two terms are distinguished from each other in that the term "resources" are used to describe those devices that are on scene and used to aide in handling a particular incident, while the term "equipment" is used to describe any apparatus capable of controlling and/or monitoring a resource. With this in mind, the following definitions are provided to aide in understanding the present invention:

Resource—Resources as, but not limited to, a drone, a robot, a camera, a bio-sensor, a heart-rate monitor, an activity and motion detector (accelerometer), activity impact (pressure sensors), a blood-pressure monitor, respiratory sensors, blood sugar monitor, or a hydration sensor, audio detectors (gunshot detector, long-range microphone), surveillance cameras, toxic gas sensor, wind direction, officer location tracking equipment, or any other piece of equipment capable of being controlled and/or monitored via officer equipment.

User equipment (sometimes simply referred to as equipment)—any device capable of controlling and/or monitoring a resource. The device may comprise, but is not limited to a laptop computer, a tablet computer, a police radio, a smart phone, . . . etc.

The RPE matches resources to available equipment operated by personnel with officers having the best capabilities for operating the equipment (e.g., the best/most relevant training or expertise for operating the resource), and minimizes redundancy by optimizing for a 1-to-1 mapping between resources and trained monitoring experts to avoid multiple experts monitoring and/or controlling the same type of resource (efficiency optimization). The RPE can remotely select voice and/or data channels in the equipment in order to prepare the equipment to receive voice/data feeds that are relevant to the involved resource. Remote channel selection could be driven by an Over-the-Air (OTA) command or message to the radio from the RPE. The RPE can remotely launch/configure/set-up relevant applications in the analysts' equipment to help analyze and/or control the resources associated with incoming data feeds. The RPE accommodates for remote launching of applications via an OTA command or message from the RPE to equipment. The RPE matches one resource to application(s) run by the equipment in a given officer's equipment to monitor and/or control the resource. Officer presence at the incident can be signaled to the RPE via officer login, wireless authentication, etc. Officer profiles for use in the incident can come from a pre-existing database or can be wirelessly communicated in an ad hoc manner.

Figure 1:
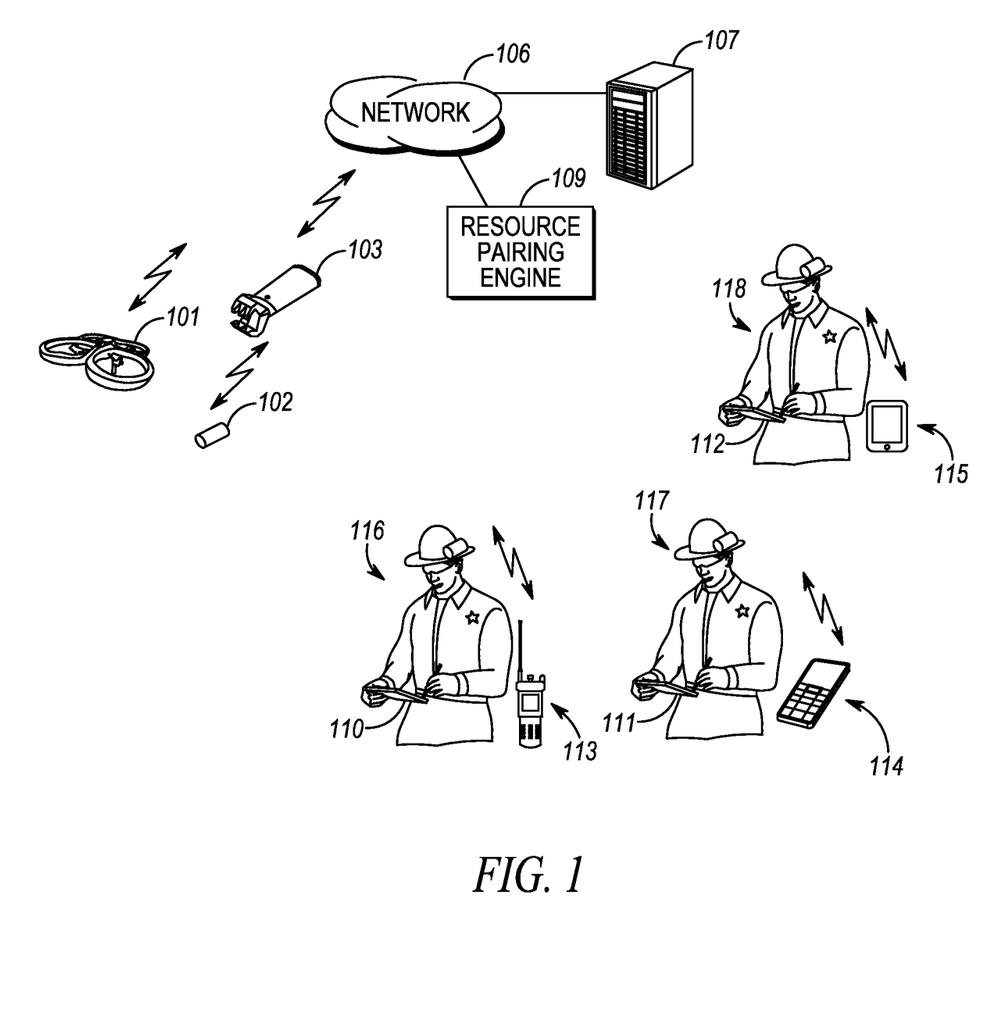
FIG. 1 illustrates a general operating environment.

Turning now to the drawings wherein like numerals designate like components, FIG. 1 illustrates a general operating environment at an incident scene. As shown in FIG. 1, multiple officers 116-118 are at the incident scene. Each officer has at least one piece of equipment that is associated with (operated by) the officer. For example, FIG. 1 shows officer 116 operating tablet computer 110, and having radio 113 assigned to him. Offer 117 is shown operating tablet computer 111 and having radio 114 assigned to him, while officer 118 is operating tablet computer 112 and has radio 115 assigned to him. Radios 113-115 may comprise such things as smart phones and/or broadband devices.

Tablet computers 110-112 and radios 113-115 are preferably capable of communicating with RPE 109 via network 106. More particularly, computers 110-112 and radios 113-115 comprise receivers and transmitters that operate utilizing one of many wireless protocols. For example computers 110-112 and radios 113-115 may utilize the APCO P25 (Project 25) communication system protocol. Other possible transmitters and receivers include, IEEE 802.11 communication system protocol, transceivers utilizing Bluetooth, HyperLAN protocols, or any other communication system protocol.

Resources 101-103 are also shown at the incident scene. These resources may comprise any device capable of providing data to an officer 116-118, and/or being controlled by the officer 116-118. These resources 101-103 comprise such resources as, but not limited to, a drone, a robot, a camera, a bio-sensor, a heart-rate monitor, an activity and motion detector (accelerometer), activity impact (pressure sensors), a blood-pressure monitor, respiratory sensors, blood sugar monitor, or a hydration sensor, audio detectors (gunshot detector, long-range microphone), surveillance cameras, toxic gas sensor, wind direction, officer location tracking apparatus, or any other resource capable of being controlled and/or monitored by equipment 110-115.

Network 106 facilitates communications among resources 101-103, devices 110-115, and RPE 109. Network 106 may comprise one of any number of over-the-air networks. For example network 106 may comprise a private 802.11 network set up by a building operator, a next-generation cellular communications network operated by a cellular service provider, or any public-safety network such as an APCO P25 network or the FirstNet broadband network.

As discussed above, it would be beneficial to quickly pair (route) resources 101-103 to the public-safety officers 116-118 that can best analyze the data and control resources 101-103. In order to address this issue, resource pairing engine (RPE) 109 and database 107 is provided. RPE 109 comprises logic circuitry capable of pairing any resource 101-103 to any officer 116-118 based on which officer is best suited to control and/or monitor a particular resource 101-103.

Database 107 is shown external to RPE 109, however, one of ordinary skill in the art will recognize that database 107 may lie internal to RPE 109. Database 107 comprises standard random access memory and is used to store information related to officers 116-118 (officer capabilities) and their associated equipment 110-115 (equipment capabilities). Database 107 comprises information such as, but not limited to:

- public-safety officers at the incident scene—This information may be updated and stored in database 107 in real time. This information may be obtained directly from equipment associated with the officers transmitting location information, or may be obtained from a dispatch center that assigned each officer to the incident scene.
- equipment associated with the public-safety officers at the incident scene—This information is preferably pre-populated in database 107, and may be updated in real time by obtaining this information from a dispatch center or by dynamically discovering and querying equipment at the scene.
- capabilities of the public-safety officers at the incident scene—This information is preferably pre-populated in database 107 and includes such information as, but not limited to rank of each officer at the incident scene, training of each officer at the incident scene, role of each officer at the incident scene, clearance levels of each officer at the incident scene, certifications of each officer at the incident scene, etc.
- capabilities of the equipment associated with the public-safety officers at the incident scene—This information is preferably pre-populated in database 107 or dynamically discovered from equipment at the scene and includes information such as but not limited to whether or not a piece of equipment has the capacity/capability to control a particular resource. For example, if a particular piece of equipment does not have a screen for viewing video, that piece of equipment will be deemed incapable of handling a video feed.

resources at the incident scene—This information is preferably pre-populated in database 107, but may be updated in real time by receiving messaging from a dispatch center or by dynamically discovering and querying resources at the scene.

During operation, RPE 109 determines public-safety officers at the incident scene, determines equipment associated with the public-safety officers at the incident scene, determines capabilities of the public-safety officers at the incident scene, determines the capabilities of the equipment associated with the public-safety officers at the incident scene, and determines the resources at the incident scene. RPE 109 pairs resources at the incident scene to public-safety officer's equipment based on the capabilities of the public-safety officers at the incident scene and/or the capabilities of the public safety officer's equipment.

RPE 109 may pair officers by:

accessing database 107 to determine a rank of an officer on scene, and pair the resource to the officer based on their rank such that higher-ranked officers on scene are granted control of the resource before lower-ranked officers;

accessing database 107 to determine a training completed by each officer on scene such that officers trained on using a resource are granted control of the resource before officers that are not trained;

accessing database 107 to determine a security level or security clearance of an officer on scene such that a security-constrained resource is only granted to officers meeting the security requirements; and/or accessing database 107 to determine the role (Incident Commander, First Responder, Firefighter, police, etc.) played by a officer on scene such that role-based access to an appropriate resource is granted.

Figure 2:
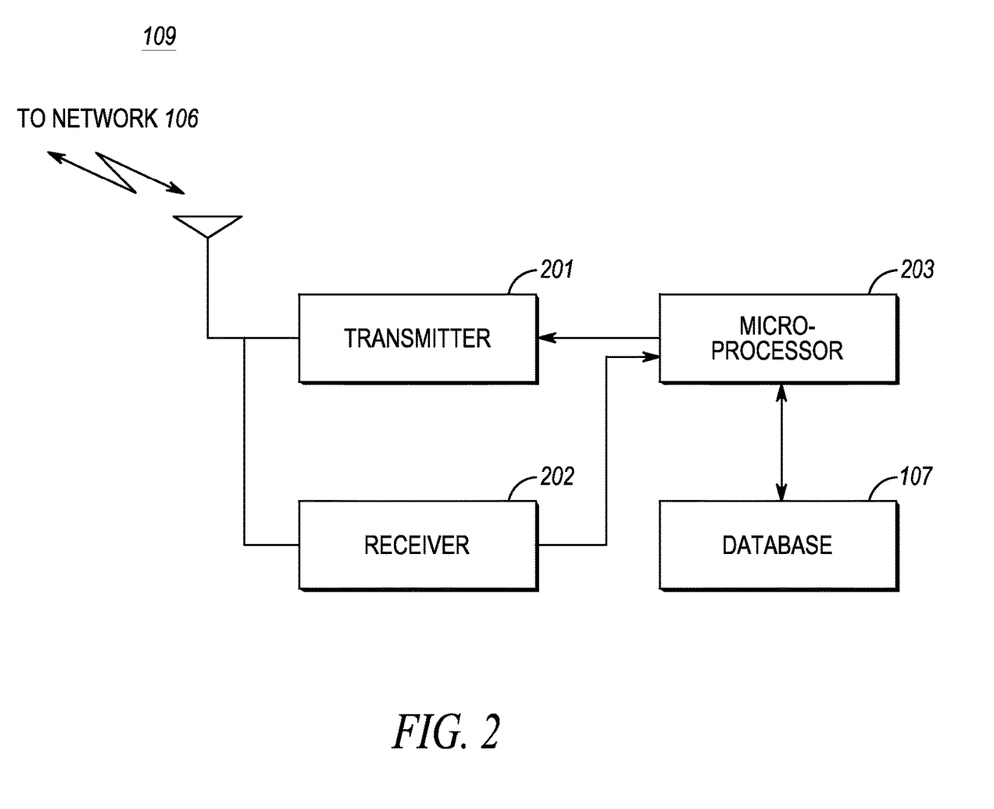
FIG. 2 is a block diagram of the resource pairing engine of FIG. 1.

FIG. 2 is a block diagram of the resource pairing engine of FIG. 1. As shown, RPE 109 comprises transmitter 201, receiver 202, microprocessor (logic circuitry) 203, and database 107 (in this particular figure, database 107 is shown existing internal to RPE 109). Logic circuitry 203 may comprise one or more of: a digital signal processor (DSP), general purpose microprocessor, a programmable logic device, and/or application specific integrated circuit (ASIC) and is utilized to determine and assign a public-safety officer to a particular resource.

As described above, database 107 may comprise standard random access memory, flash memory, etc. and is used to store information related to the assignment of resources. Such information may comprise public-safety officers at the incident scene, equipment associated with the public-safety officers at the incident scene, capabilities of the public-safety officers at the incident scene (clearance levels of officers, role played at incident, officer rank, training, certifications, etc), capabilities of the equipment associated with the public-safety officers at the incident scene (e.g., whether or not the equipment has the capability to control a particular resource), and the resources at the incident scene.

Receiver 202 and transmitter 201 may be well known long-range transceivers that utilize the APCO P25 (Project 25) communication system protocol. Other possible transmitters and receivers include, IEEE 802.11 communication system protocol, transceivers utilizing Bluetooth, HyperLAN protocols, or any other communication system protocol. Receiver 202 may be utilized to receive updates on public-safety officers at the incident scene, equipment associated with the public-safety officers at the incident scene, capabilities of the public-safety officers at the incident scene (clearance levels of officers, role played at incident, officer rank, training, certifications, etc), capabilities of the equipment associated with the public-safety officers at the incident scene (e.g., whether or not the equipment has the capability to control a particular resource), and the resources at the incident scene.

During operation receiver 202 receives information indicating which public safety officers are at a particular incident scene and what equipment is at a particular incident scene. Information as to what equipment is assigned to what officer on the scene is also received, or may be pre-populated in database 107. All the above information may be received from a dispatch center, location-finding equipment attached to each officer, officer logins, wireless identifications and/or authentication of officers, ad-hoc and/or pre-existing officer database(s), etc.

Receiver 202 also receives information as to what resources are located at the incident scene. This information may be received from the dispatch center or pre-populated in database 107, wireless identification and/or authentication of resources, pre-existing (native) and/or ad-hoc resource database(s), etc.

The above information is provided to logic circuitry 203. Logic circuitry 203 then uses the above information and accesses database 107 to determine a best officer for assigning a particular resource (as described above). This may entail accessing the database to determine public-safety officers at the incident scene, equipment associated with the public-safety officers at the incident scene, capabilities of the public-safety officers at the incident scene (clearance levels of officers, role played at incident, officer rank, training, certifications, etc), capabilities of the equipment associated with the public-safety officers at the incident scene (e.g., whether or not the equipment has the capability to control a particular resource), and the resources at the incident scene. Logic circuitry 203 then pairs resources at the incident scene to public-safety officer's equipment.

Logic circuitry instructs transmitter 201 to message the appropriate equipment. The message provides instructions to access the resource. In addition, the message may contain instructions to download and/or run a particular application that will control and/or monitor the resource. The application may be pushed to the equipment from RPE 109 by RPE 109 accessing database 107 (containing the application) and using transmitter 201 to transmit the application.

Figure 3:
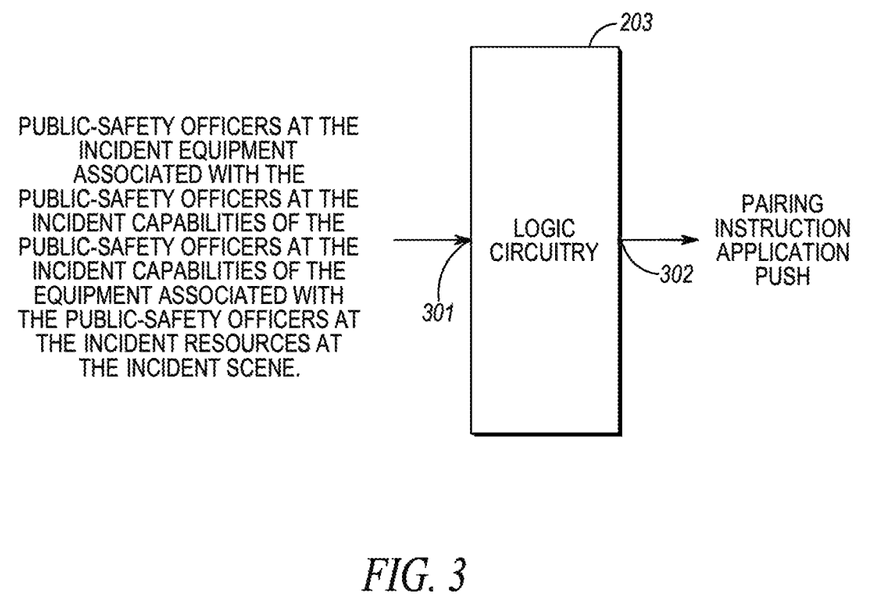
FIG. 3 illustrates the logic circuitry of FIG. 2.

FIG. 3 illustrates an apparatus comprising a database and logic circuitry accessing the database and determining public-safety officers at an incident scene, equipment associated with the public-safety officers at the incident scene, capabilities of the public-safety officers at the incident scene, capabilities of the equipment associated with the public-safety officers at the incident scene, and resources at the incident scene. The logic circuitry also determines a pairing between a first piece of equipment and a first resource operated by a first officer. A transmitter is provided for transmitting instructions to pair the first piece of equipment and the first resource.

As discussed above, the first officer is determined best capable of operating the first resource as indicated by the database, and the transmitter may transmit software for operating the first resource to the first piece of equipment, wherein the software aides the first officer in operating the first resource.

The first piece of equipment may comprise any device capable of controlling and/or monitoring a resource, and the first resource may comprise a drone, a robot, a camera, a bio-sensor, a heart-rate monitor, an activity and motion detector, an accelerometer, pressure sensors, a blood-pressure monitor, respiratory sensors, blood sugar monitor, or a hydration sensor, audio detectors, surveillance cameras, toxic gas sensor, wind direction sensor, officer location tracking equipment, or any other piece of equipment capable of being controlled and/or monitored by the equipment.

Additionally, the capabilities of the equipment comprise equipment's ability to operate a resource, and the capabilities of the public-safety officers comprise a rank, a training, a role of, a clearance/security level, or a certification.

FIG. 3 is a block diagram showing the logic circuitry of FIG. 2. As shown, logic circuitry 203 has as an input 301 information related to public-safety officers at the incident scene, equipment associated with the public-safety officers at the incident scene, capabilities of the public-safety officers at the incident scene (clearance levels of officers, role played at incident, officer rank, training, certifications, etc), capabilities of the equipment associated with the public-safety officers at the incident scene (e.g., whether or not the equipment has the capability to control a particular resource), and the resources at the incident scene.

Based on this information, logic circuitry 203 outputs (at output 302) pairing instructions and/or instructions to push an application to equipment. These instructions are passed to transmitter 201 where they are conveyed to the appropriate piece of equipment on scene.

The logic circuitry shown in FIG. 3 is preferably coupled to a database. The logic circuitry has an input 301 from the database, and an output 302, wherein the input comprises public-safety officers at an incident scene, equipment associated with the public-safety officers at the incident scene, capabilities of the public-safety officers at the incident scene, capabilities of the equipment associated with the public-safety officers at the incident scene, and resources at the incident scene. The output comprises instructions to pair first equipment at the incident scene with a first resource.

Figure 4:
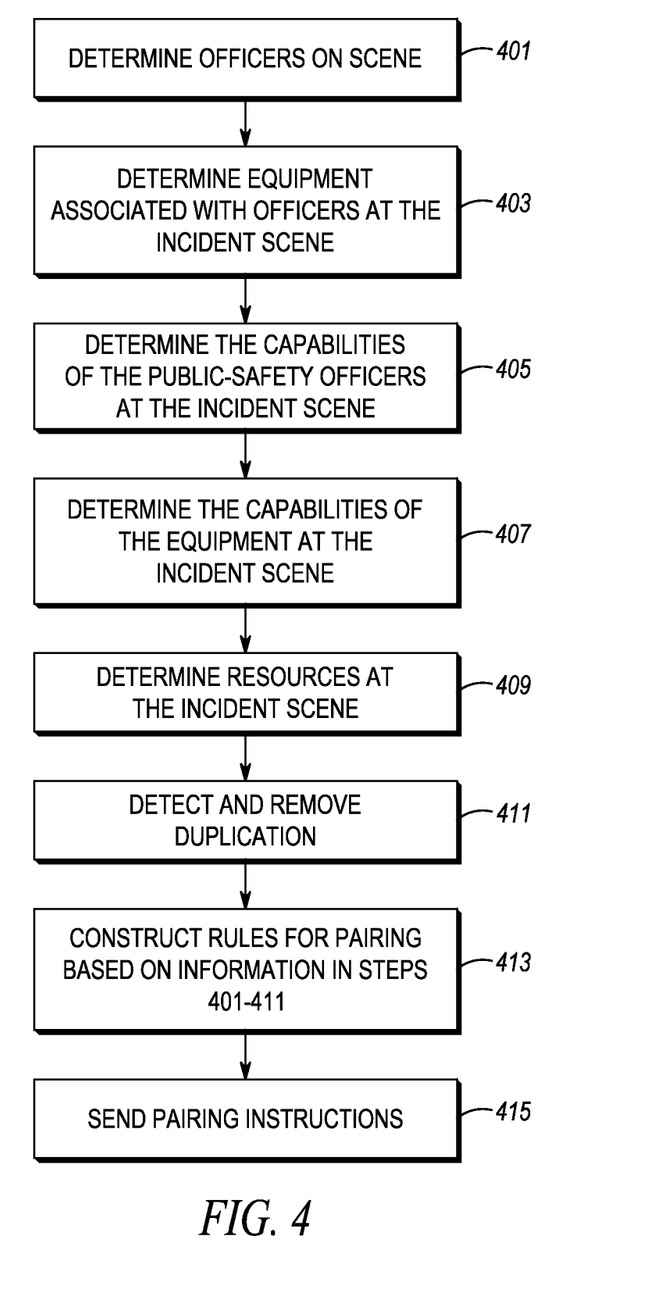
FIG. 4 is a flow chart showing operation of the resource pairing engine of FIG. 2.

FIG. 4 is a flow chart showing operation of the resource pairing engine of FIG. 2. More particularly, the logic flow of FIG. 4 illustrates a method for pairing resources to equipment at an incident scene. Not all steps shown below are necessary. Logic circuitry 203 determines public-safety officers at the incident scene (step 401), determines equipment associated with the public-safety officers at the incident scene (step 403), determines capabilities of the public-safety officers at the incident scene (clearance levels of officers, role played at incident, officer rank, training, certifications, etc) (step 405), determines capabilities of the equipment associated with the public-safety officers at the incident scene (e.g., whether or not the equipment has the capability to control a particular resource) (step 407), and determines the resources at the incident scene (step 409). Steps 401-409 are preferably accomplished by logic circuitry 203 accessing database 107 to determine the above information. Logic circuitry 203 detects and removes duplicate users operating equipment (step 411) and constructs rules for pairing based on steps 401-411 (step 413). Finally, instructions are sent to pair resources at the incident scene to public-safety officers' equipment based on the capabilities of the public-safety officers at the incident scene (step 413).

As discussed above, the step of pairing resources comprises the step of pairing a particular resource with a particular officer that is best capable of operating the particular resource as indicated by the database.

Additionally, logic circuitry 203 may instruct transmitter 201 to push/transmit software for operating the particular resource to equipment operated by the particular officer if it is determined that the equipment does not contain the adequate software to operate the resource. The software aides the particular officer in operating the particular resource.

As discussed above, the step of transmitting the instructions to pair the resources comprise the step of transmitting instructions to pair a first resource to equipment operated by a first officer, wherein the first officer is best capable of operating the first resource as indicated by the database.

Additionally, software for operating the first resource may be transmitted to the equipment operated by the first officer, wherein the software aides the first officer in operating the first resource.

As discussed, the equipment operated by the first officer comprises any device capable of controlling and/or monitoring the first resource, and the first resource comprise a drone, a robot, a camera, a bio-sensor, a heart-rate monitor, an activity and motion detector, an accelerometer, a pressure sensor, a blood-pressure monitor, a respiratory sensor, a blood sugar monitor, a hydration sensor, an audio detector, a surveillance camera, a toxic gas sensor, a wind direction sensor, an officer location tracking equipment, or any other piece of equipment capable of being controlled and/or monitored by the equipment operated by the first officer.

As discussed above, the capabilities of the equipment comprise equipment's ability to operate a resource, and the capabilities of the public-safety officers comprise a rank, a training, a role of, a clearance/security level, or a certification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising the steps of:
   accessing a database and determining public-safety officers at an incident scene;
   accessing the database and determining radios associated with the public-safety officers at the incident scene;
   accessing the database and determining capabilities of the public-safety officers at the incident scene;
   accessing the database and determining capabilities of the radios associated with the public-safety officers at the incident scene;
   accessing the database and determining cameras, drones, or robots at the incident scene, the cameras, drones, or robots not being associated with public safety officers at the incident scene;
   determining a first public safety officer that is the best capable of operating the cameras, drones, or robots based on the determined capabilities of the public safety officers at the incident scene and the determined capabilities of the radios associated with the public-safety officers at the incident scene; and
   transmitting instructions to pair cameras or drones or robots at the incident scene to a first radio associated with the first public safety officer, wherein the pairing is a 1-to-1 mapping;
   transmitting software for operating the camera to the radio operated by the first officer, wherein the software aides the first officer in operating the camera; and
   wherein the instructions to pair causes radios associated with the public-safety officers to view and control at least one camera at the incident scene; and
   wherein the step of determining capabilities of the public-safety officers comprises the step of determining if the public-safety officers are certified in operating the cameras, drones, or robots at the incident scene.

2. The method of claim 1 wherein the capabilities of the public-safety officers comprise a rank, a training, a role of, a clearance/security level, or a certification.

3. An apparatus comprising:
   a database;
   logic circuitry accessing the database and determining public-safety officers at an incident scene, radios associated with the public-safety officers at the incident scene, capabilities of the public-safety officers at the incident scene, capabilities of the radios associated with the public-safety officers at the incident scene, and cameras at the incident scene, wherein the cameras are not paired with any public safety officers at the incident scene;
   wherein the logic circuitry determines a first officer best capable of operating a first camera, drone, or robot based on the capabilities of the public-safety officers at the incident scene, capabilities of the radios associated with the public-safety officers at the incident scene, and cameras at the incident scene; and
   wherein the logic circuitry also determines an association between a first radio and the first officer; and a transmitter transmitting instructions to pair the first radio and the first camera, wherein the transmitter transmits software for operating the first camera to the radio, wherein the software aides the first officer in operating the first camera;

wherein the first radio comprises a device capable of controlling and monitoring the camera, drone, or robot; and wherein the capabilities of the public-safety officers comprises a certification in operating the cameras, drones, or robots at the incident scene.

4. The apparatus of claim 3 wherein the capabilities of the radios comprise radio's ability to operate a camera.

5. The apparatus of claim 4 wherein the capabilities of the public-safety officers comprise a rank, a training, a role of, a clearance/security level, or a certification.

6. An apparatus comprising:

a database;

logic circuitry coupled to the database, and having an input from the database, and an output, wherein the input comprises public-safety officers at an incident scene, radios associated with the public-safety officers at the incident scene, capabilities of the public-safety officers at the incident scene, capabilities of the radios associated with the public-safety officers at the incident scene, and cameras, drones or robots at the incident scene, the cameras, drones or robots at the incident scene not being associated with the public safety officers at the incident scene;

wherein the output comprises instructions to pair a first radio at the incident scene with a first camera, drone or robot, the first radio associated with a first officer, the first officer having been determined to be the best capable of operating the first camera based on the capabilities of the public safety officers at the incident scene, the capabilities of the radios associated with the public safety officers at the incident scene, and the cameras, drones or robots at the incident scene, wherein the transmitter transmits software for operating the first camera to the first radios, wherein the pairing is a 1-to-1 mapping; and wherein the first radio is capable of controlling and monitoring the first camera; and wherein the capabilities of the public-safety officers comprises a certification of the public-safety officer to operate the first camera, drone, or robot.

7. The apparatus of claim 1 wherein the capabilities of the radios comprise radio's ability to operate a camera.

8. The apparatus of claim 7 wherein the capabilities of the public-safety officers comprise a rank, a training, a role of, a clearance/security level, or a certification.

* * * * *